United States Patent [19]

Grataloup

[11] Patent Number: 4,594,951
[45] Date of Patent: Jun. 17, 1986

[54] REGULARIZING DEVICE FOR THE DEPTH OF A FURROW

[75] Inventor: Xavier R. Grataloup, Montereau, France

[73] Assignee: J. I. Case Company, Racine, Wis.

[21] Appl. No.: 3,642

[22] Filed: Jan. 15, 1979

[30] Foreign Application Priority Data

Jan. 25, 1978 [FR] France .................. 78 02081

[51] Int. Cl.⁴ .................. A01C 5/06; A01C 7/20
[52] U.S. Cl. .................. 111/85; 111/88; 172/239; 172/395; 172/421; 172/538
[58] Field of Search .................. 280/6.11, 6 R, 6 H; 180/41; 172/400, 406, 414, 421, 395, 239, 714, 427, 657, 538, 439, 462; 111/52, 1, 59, 61–66, 84, 85, 81, 88, 87

[56] References Cited

U.S. PATENT DOCUMENTS

| 821,070 | 5/1906 | Weaver | 180/41 |
|---|---|---|---|
| 1,604,897 | 10/1926 | Futter | 172/400 |
| 1,875,778 | 9/1932 | Taylor | 280/6.11 |
| 2,191,929 | 2/1940 | Strandlund | 172/395 |
| 2,599,065 | 6/1952 | Newkirk | 172/400 |
| 2,685,243 | 8/1954 | Cole | 111/88 X |
| 3,115,853 | 12/1963 | Gellner | 111/85 X |
| 3,558,148 | 1/1971 | Johnson | 280/6.11 |
| 3,570,605 | 3/1971 | Rikli | 172/462 |
| 4,009,668 | 3/1977 | Brass et al. | 111/88 |
| 4,135,457 | 1/1979 | Willis | 111/52 |

FOREIGN PATENT DOCUMENTS

| 247550 | 3/1963 | Australia | 172/439 |
|---|---|---|---|
| 1261431 | 4/1961 | France | 172/421 |
| 1261393 | 4/1961 | France | 172/421 |
| 174279 | 2/1961 | Sweden | 180/41 |
| 308256 | 2/1969 | Sweden | 180/41 |
| 784185 | 10/1957 | United Kingdom . | |
| 572238 | 9/1977 | U.S.S.R. | 111/87 |

Primary Examiner—Steven A. Bratlie
Attorney, Agent, or Firm—Dressler, Goldsmith, Shore, Sutker & Milnamow, Ltd.

[57] ABSTRACT

The device is mounted on a seeder provided with a hopper, with a seed distributor and with a plowshare or work disk. It comprises two lateral gauge wheels mounted on two bearings borne by two arms pivotably articulated around an axis on the chassis of the seeder. A class 1 lever formed from a rod is extended by two sliding sleeves articulated respectively at its middle around a ball-joint adjustable in position with respect to the chassis and at its two ends around the two other ball-joints fastened to the oscillating support arms. The device is useful in agricultural machines having a plowshare or work disk.

18 Claims, 10 Drawing Figures

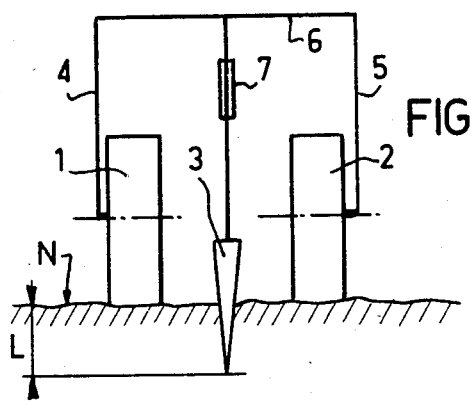 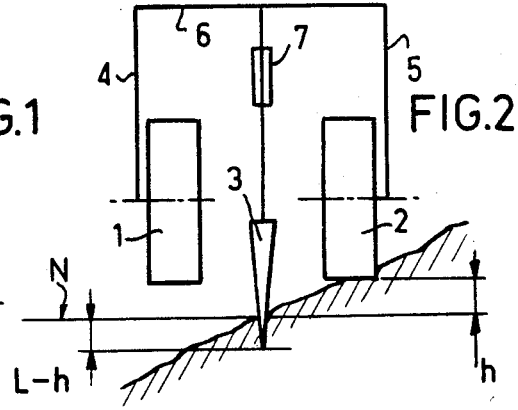
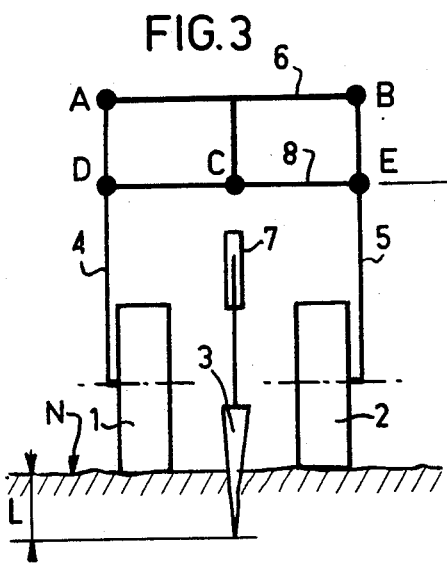 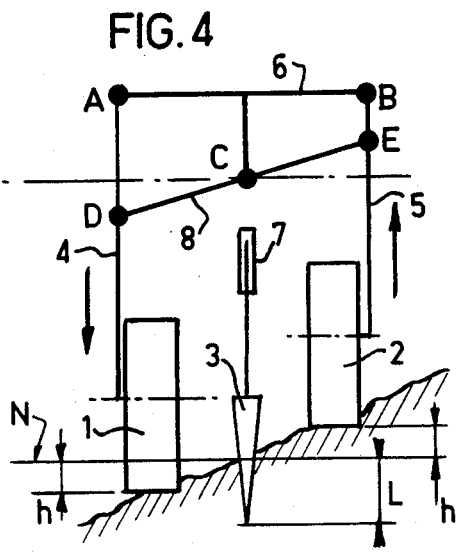
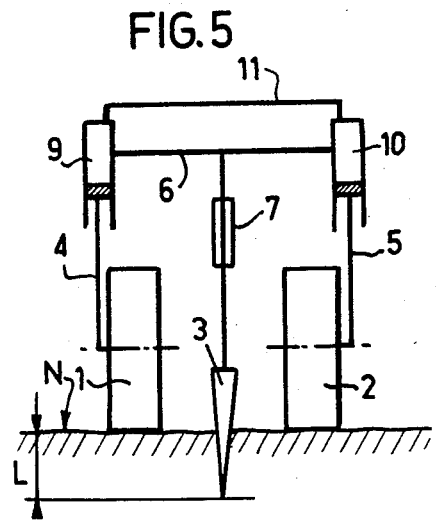 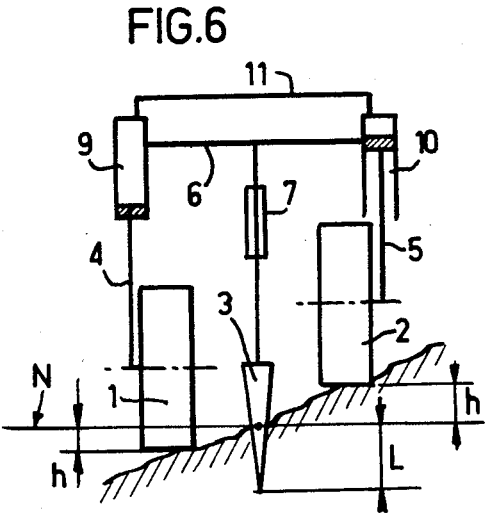

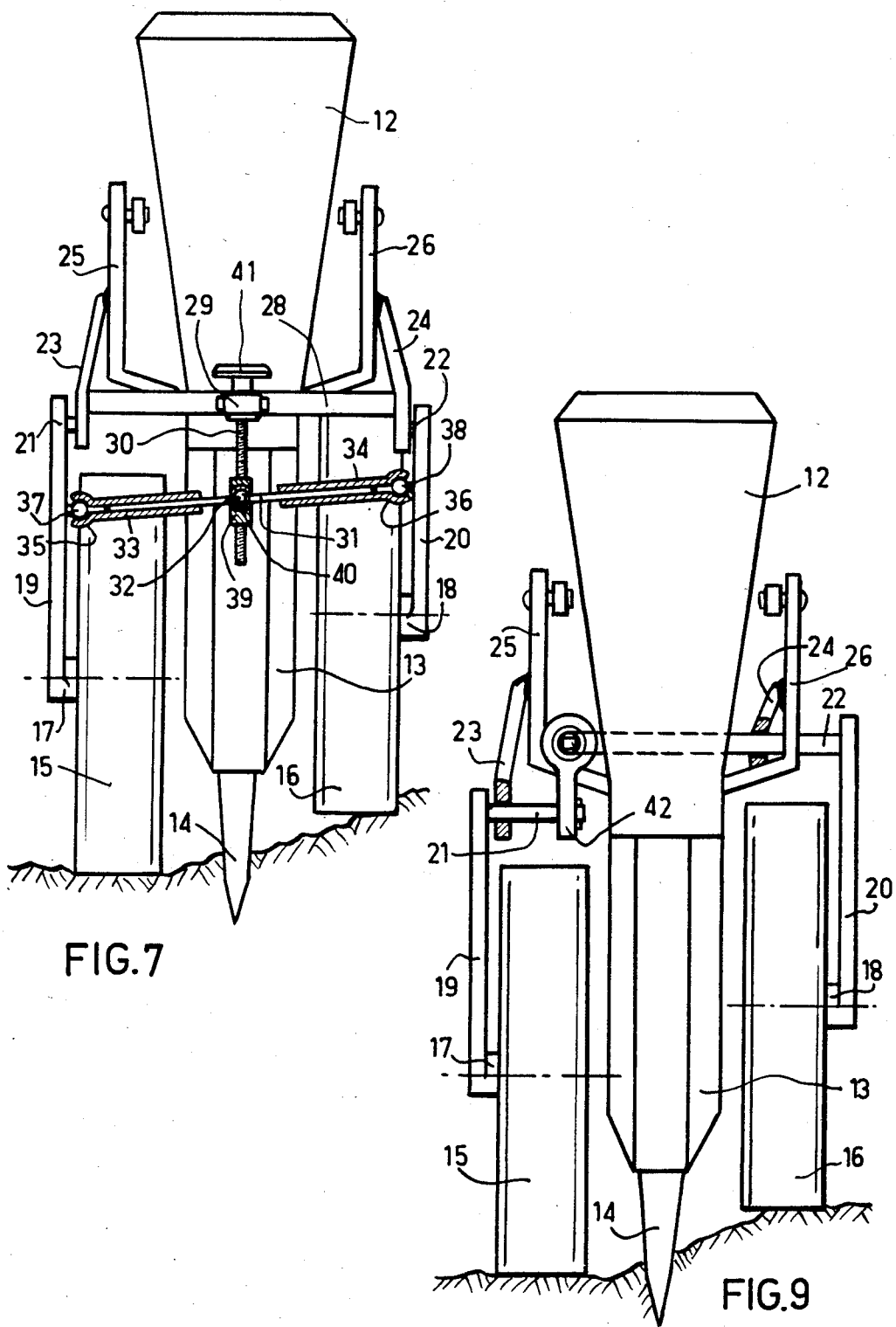

REGULARIZING DEVICE FOR THE DEPTH OF A FURROW

1. Field of the Invention

The present invention relates to a device for regularising the depth of a furrow.

Present day devices which enable adjustment of the depth of the furrow ploughed in the soil by the ploughshare or work disk of an agricultural machine generally include two wheels arranged symmetrically on each side of said ploughshare, these wheels being designed to support and to position the latter with respect to the soil. In these devices, the depth of the furrow to be channeled is determined in resting position by adjusting the distance between the tip of the ploughshare and the bottom of the wheels, this distance then remaining fixed in the course of the movement of the machine.

2. Description of the Prior Art

A device of this type is notably described in French Pat. No. 482,174 which recommends its use in combination with a seeder.

Now, numerous agricultural machines and in particular seeders, are generally used in groups of several units arranged side-by-side in a row and pivoted to a traction bar connected to the rear of a tractor perpendicular to the direction of movement, the connecting joints only permitting vertical swings of said machines with respect to the traction bar and preventing their lateral tilting. On strictly flat ground, these known devices, in fact, permit the ploughing of furrows of substantially constant depth, but if one of the machines pulled encounters a transversely oriented difference in level, it is no longer supported except by the wheel in contact with the upper part of the ground irregularity, the other wheel being then lifted due to the fact that the machine cannot tilt laterally, so that the ploughshare is extracted from the soil by a height substantially equal to one-half of the existing separation between the soil and the lifted wheel, the depth of the furrow opened by the ploughshare of a given machine varying, consequently, according to the inclination of the transverse traction bar with respect to the portion of ground located vertically below said machine.

There also exist self-leveling devices for agricultural machines, for example of the type described in French utility certificate No. 74.16634 published under No. 2,229,343. These devices include a deformable parallelogram which ensures the horizontality of the chassis of the machine and the verticality of the wheels of the latter whatever the slope of the ground but they do not enable the plough cutters to be freed from the inclination of the coupling bar to which they are connected.

It is therefore an object of the present invention to provide a device enabling the inclination of a traction bar to be freed with respect to the transverse profile of the ground at the level of the machine equipped with said device with the effect of obtaining a furrow of substantially constant depth whatever the ground irregularities encountered by this machine in its path.

GENERAL DESCRIPTION OF THE INVENTION

According to the invention, a device for regularising the depth of a furrow ploughed by a ploughshare or work disk borne by an agricultural machine, comprises two trailing wheels arranged on each side of the longitudinal middle plane of the ploughshare and support arms for the bearings of said wheels which are connected to the chassis of the machine, the device also comprising means enabling each wheel to be moved vertically with respect to the ploughshare, as well as means ensuring coordination of the vertical movements of each wheel with those of the other wheel so that they are effected in reverse direction and are in the ratio of the distances of said wheels to the longitudinal middle plane of the ploughshare between one another.

Preferably, the two wheels are arranged conventionally at an equal distance from the middle plane of the ploughshare, on both sides of the latter, and a means enabling the wheels to be moved vertically consists notably of pivoting or sliding connections of the bearing supports on the chassis of the machine or again by using telescopic bearing supports. As for the means for coordinating the movements, they could be, notably, lever arms or link rod systems connecting the two bearing supports, or again jacks.

BRIEF DESCRIPTION OF THE DRAWINGS

The invention will now be described in more detail with reference to particular embodiments given by way of purely illustrative and non-limiting examples, with reference to the accompanying drawings, in which:

FIGS. 1 and 2 illustrate the present state of the art, showing a machine resting respectively on ground parallel to its chassis and inclined with respect to the latter;

FIGS. 3 and 4 illustrate diagrammatically the operation of a device according to the invention ensuring the coordination of the vertical movements of the wheels by means of a lever when the ground is inclined with respect to the chassis of the machine;

FIGS. 5 and 6 illustrate the operation of another embodiment of a machine according to the invention utilising hydraulic jacks;

FIG. 7 shows a rear view of a seeder equipped with a device according to the invention of the lever type;

FIG. 9 shows a rear view of a seeder equipped with another embodiment of a device according to the invention utilising a link rod system;

DESCRIPTION OF PREFERRED EMBOIDMENTS

Figure 8:
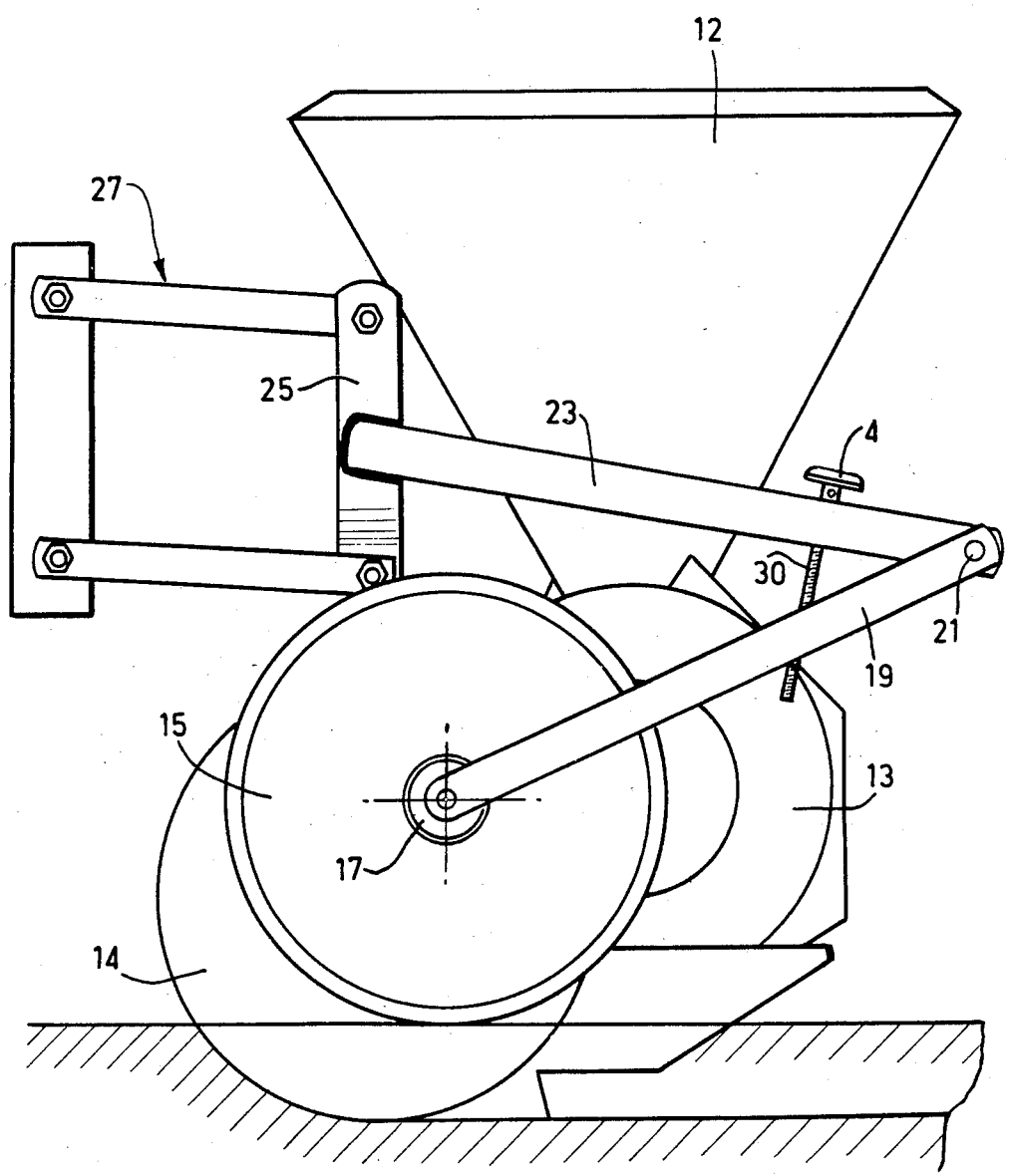
FIG. 8 shows a profile view of the seeder of the embodiment of FIG. 7.

As shown diagrammatically in FIGS. 1 and 2, the presently known conventional devices include two gauge wheels 1 and 2 arranged on each side of the middle plane of the ploughshare 3 and equidistant from this plane. The wheels 1 and 2 are supported respectively by the support arms 4 and 5 connected rigidly to the chassis 6 of the machine and a ploughshare 3 is also connected to the chassis but through an adjusting means 7 enabling the variation, when at rest, of the distance that the tip of the ploughshare projects beneath the lower level of the wheels. If L is the depth of penetration of the ploughshare 3 beneath the level N of the ground at the position of the furrow, it is observed (FIG. 2) that the penetration of the ploughshare decreases by h when the machine encounters a transverse irregularity such that the wheel 2 is lifted through a height h above the initial level N and that the wheel 1 is elevated from the ground due to the fact that the rigidity of the assembly and that the traction bar prevents the machine from tilting laterally. If the slope of the ground irregularity is very great, the ploughshare may even emerge completely from the soil, thus interrupting the furrow.

In the devices according to the invention and notably that shown diagrammatically in FIGS. 3 and 4, the ploughshare 3 is also fixed to the chassis 6 of the machine through a known adjusting means 7 but the lateral bearing means 4 and 5 are either pivotably joined or slidably mounted at A and B on the chassis 6 and a supplementary class 1 lever 8 pivoted at its middle around a fixed point C of the chassis is also pivoted at its ends at D with a support 4 and at E with the support 5, the arms of said lever 8 being made telescopic to permit variations in length according to its inclination with respect to the chassis around the point C. On flat ground of level N parallel to the chassis 6 (FIG. 3), the lever 8 is also substantially parallel to the chassis and the ploughshare 3 penetrates by length L into the soil. When the machine encounters an irregularity (FIG. 4) in its path, the wheel 2 situated at the upper part of the slope is raised through a height h and the bearing support 5 causes to approach the chassis, the pivot E of the lever 8 which tilts around the fixed point C of said chassis and pushes downwards the support 4 and the wheel 1 through its opposite pivot D, the movements h of the two wheels being equal and opposite due to the fact that the wheels are arranged at an equal distance from the ploughshare on both sides of its middle plane. Under these conditions, the wheel 1 rests on the ground as well as that the wheel 2 and the fixed point C of the chassis around which the lever pivots, does not move vertically, no more moreover than the chassis, due to the fact that the vertical movements h of the wheels are symmetrical and mutually compensate their effects. Consequently, the ploughshare 3 which, in operation, is fixed with respect to the chassis, still penetrates to the same depth L in the ground and channels a furrow of regular depth.

Exactly the same result is achieved by no longer using mechanical means (lever) for coordinating the movements of the bearing support arms, but a hydraulic means (jacks) as in the embodiment illustrated diagrammatically in FIGS. 5 and 6. In this embodiment (FIG. 5), the upper ends of the bearing support arms 4 and 5 are connected to the hydraulic jack pistons 9 and 10 whose bodies are fixed rigidly to the chassis 6 of the machine, the ploughshare 3 being still connected to the chassis through an adjusting means 7 for the depth of the furrow. The two jacks are mutually servocoupled through a fluid pipe 11 placing the cylinders in communication. When the machine encounters a difference in level (FIG. 6), the wheel 2 is lifted with respect to the ploughshare and its support 5 pushes its associated piston back into the cylinder of the jack 10, which has the effect of increasing the pressure and of driving through the pipe 11 and into the jack 9, a volume of fluid proportional to the movement of the wheel 2. This fluid volume introduced into the jack 9 causes the pressure to increase and pushes downwards the piston of the cylinder 9 as well as the support arm 4 and the wheel 1 by distance h equivalent to that which the wheel 1 has risen. The two movements are equal and of opposite direction, so that the ploughshare 3 situated at an equal distance from the two wheels does not move and continues to penetrate the soil by a length L, thus ploughing a furrow of substantially constant depth.

It is hence observed that, by means of the device according to the invention, it is possible to regularise the depth of a furrow whatever the profile of the ground to be sown. Few cases exist where the desired result would not be completely achieved and in particular in the case where the irregularity would not be of gentle slope but on the contrary rather sudden, such as a step, which is rather rare in a field prepared for seeding. Another case more frequent, would be that where one of the wheels rolling over flat ground encounters a rather large stone, the lifting of the wheel resulting in that of the ploughshare from the flat ground, by a height which is only equal to one-half of that of the stone, which reduces the drawback just the same. A device of the lever type whose principle of operation has just been described was mounted on a seeder such as that shown in FIGS. 7 and 8. This seeder includes a hopper 12, a seed distributor 13 and a work disk or ploughshare 14 framed on each side by gauge wheels 15 and 16 whose bearings 17, 18 are borne by one end of the swinging support arms 19 and 20 whose other end is pivotably articulated respectively at 21 and 22 around a substantially horizontal axis, at the rear end of fixed arms 23 and 24 whose front end is fixed rigidly by welding to a pillar 25, 26 of a traction parallelogram 27. The two rigid arms 23 and 24 are situated on each side of the hopper 12 and rigidly connected together, behind the latter, by a welded cross-piece 28 provided at its middle with nuts 29 traversed by an adjusting screw 30 substantially perpendicular to the cross-piece and obliquely oriented in the middle vertical plane of the seeder. The two swing arms 19 and 20 are also connected through a class one lever ensuring the coordination of their movements, this lever being essentially constituted by a cylindrical rod 31 provided at its middle with a spherical portion 32 and on which are slideably mounted on each side of said sphere 32 sleeves 33 and 34 each provided at their outer end with a spherical casing 35, 36 for housing a corresponding sphere 37, 38 rigidly fixed to the adjacent arm 19, 20. Said spheres are housed in spherical housings 35, 36 to form ball joints. A nut 40 provided laterally with a spherical housing 39 is mounted on the one hand on the sphere 32 to constitute a central ball joint (32, 39) and on the other hand is screwed on the screw 30 including at its upper portion an adjusting knob 41.

The operation will be easily understood.

When one of the wheels, for example, the wheel 16 (FIG. 7), rises over a ground protuberance its bearing or hub 18 is lifted with respect to the ploughshare 14 and the angle that its swing support arm 20 forms with the rigid arm 24 closes, with the effect of lifting the ball joint 36–38 and causing the class one lever to tilt, coordinating the movements of the wheels around its central ball joint 32–39, the opposite arm of the lever thus pushing downwards the swing pivot arm 19 through the coupling ball joint 35–37. The fixed tilting point constituted by the central ball joint 32–39 being located at the middle of the lever, the movement of the wheel 15 is equal to that of the wheel 16 but in reverse direction.

As for the adjustment of the depth of penetration of the ploughshare 14 into the soil, the latter is effected at rest, before starting operations, by means of the screw 13 which is screwed or unscrewed into the nut 40 by means of the knob 41, which has the effect of moving the fixed point 32, 39 of the lever with respect to the chassis of the machine and consequently of modifying the position of the chassis and hence of the ploughshare 14 associated with it, with respect to the wheels and thus causing the penetration of the ploughshare into the soil to vary.

Figure 10:
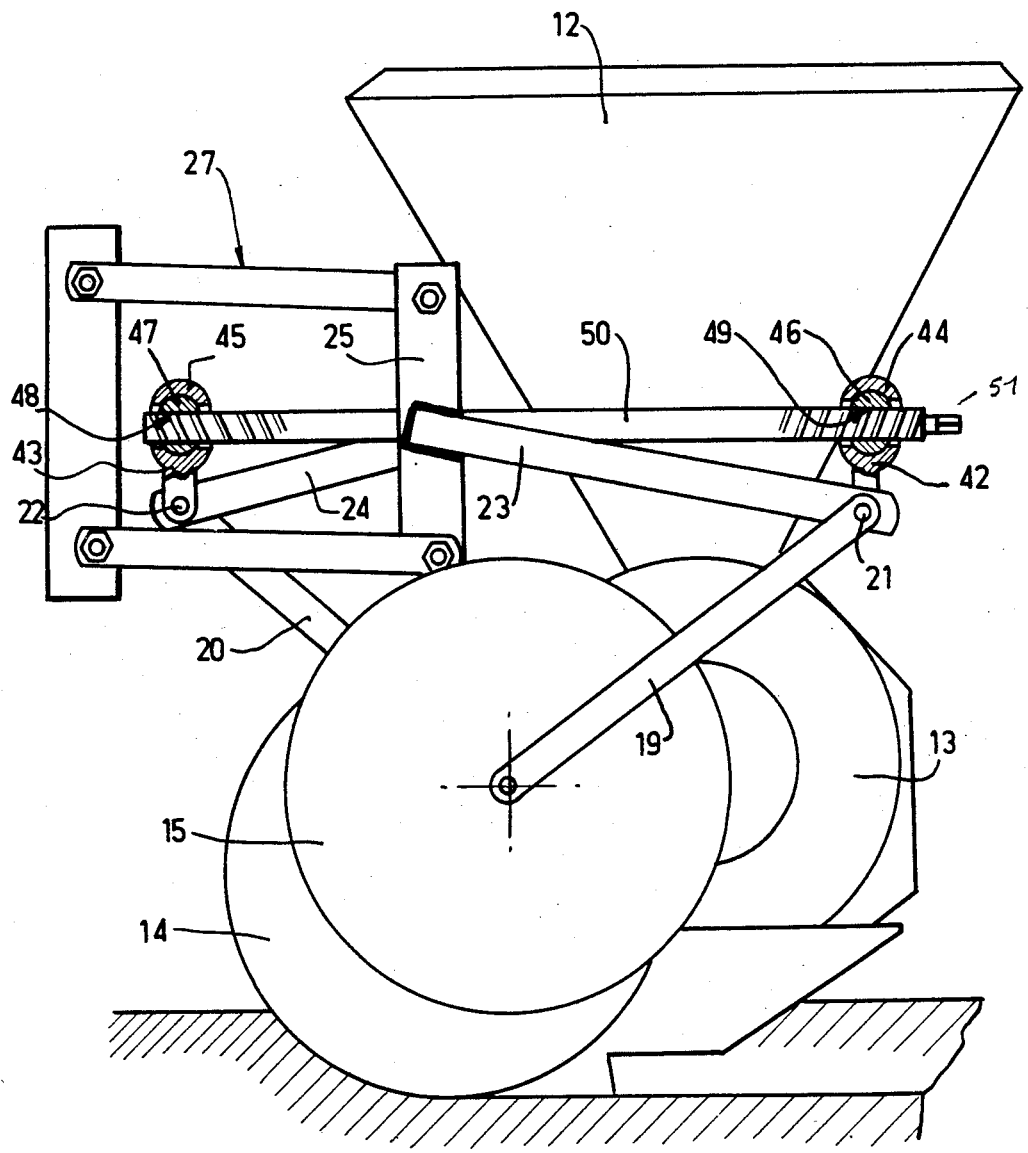
FIG. 10 is a profile view of the seeder of FIG. 9.

In the embodiments shown in FIG. 9 and 10, the devices according to the invention is of the link rod type.

The seeder element includes as previously a hopper 12, a distributer 13, a work disk or ploughshare 14, two lateral gauge wheels 15 and 16 held at equal distance from the ploughshare 14 in two bearings 17, 18 by two support arms 19 and 20 swingably mounted around pivots 21 and 22 borne respectively by two rigid arms 23 and 24 welded to the pillars 25 and 26 of a traction parallelogram 27. However, it will be noted that the rigid arms 23 and 24 are oriented in opposite directions, one 24 forwards and the other 23, rearwards, the two swing arms 19 and 20 being themselves also oriented in reverse directions, with a constant aperture angle between them, the arm 19 being directed forwards and the arm 20 rearwards. In addition, in this modification, the pivots 21 and 22 are constitued by axles rigidly connected at one end to the arms with which they are associated, each including at the other end a short arm 42, 43 rotatably connected with the corresponding pivot, for example by keying, the assemblies constituted respectively by an oscillating arm 19, 20 a pivot 21, 22 and a short arm 42, 43 forming bent levers articulated at one end of the fixed arms 23, 24. The short arms 42, 43 are provided at their free ends with spherical housings 44, 45 in which can swing spherical nuts 46, 47 traversed by tapped bores 48, 49 designed to receive the threaded ends of a rod or linkage 50, the threadings of the two ends of the rod being of reversed equal pitch. It will be noted that the two bent levers thus constituted are provided either identical or with arm sizes such that the ratios of the short arms to the bearing support arms are equal so that a certain movement of one end of a lever corresponds to an equal movement of the corresponding end of the other lever and reciprocally.

The rear end of said threaded rod 50 includes an end of square cross-section 51 provided to enable the rotation of the rods by means, for example, of a crankhandle or a key, this rotation having the effect of bringing together or separating the two ball joints constituted by the housings 44, 45 and the associated inner spheres 46, 47 which are screwed or unscrewed on the rod 50 due to the fact that a suitable means such as a keying is provided to hold them in rotation along the axis of the rod in their housings 44, 45. The variations in separation between the two ball joints 44, 46 and 45, 47 result in rotations in reverse directions of the bent levers 19, 42 and 20, 43 around their respective axis 21, 22 and, consequently, variations in the aperture angle between the two edges and simultaneous vertical displacements of the two gauge wheels 15 and 16 with respect to the chassis of the machine and to the ploughshare share 14 fixed to the latter, which determines the penetration of said ploughshare into the soil and the depth of the furrow to be channeled, this adjustment being effected at rest, before starting to plough the ground.

The operation of the device for regularising a furrow is as follows. When the machine encounters an irregularity in level and one of the wheels, for example wheel 16, mounts the bump of ground (FIG. 9) it recedes vertically from the tip of the ploughshare and rotates, in counter-clockwise direction (FIG. 10) and around the axle of the pivot 22, the elbow lever formed by the arm 20, the pivot 22 and the short arm 43 keyed to said pivot which, through its ball joint 45, 47, pulls, towards the front of the seeder, the threaded rod 50 which transmits the traction to the rear short arm 42 through its ball joint 44, 46 and causes rotation around the axle of the pivot 21, and also in anti-clockwise direction, of the opposite pivot arm 19. As the two arms 19 and 20 are oriented in opposite directions with a constant aperture angle in the operation of the machine, a rotation in the same direction of the latter is manifested by reverse vertial movements of the wheels 15 and 16 which are respectively associated with them, and consequently, the wheel 16 rising through a height h with respect to its average resting position, the wheel 15 is lowered by the same distance h due to the face that the transmission ratios of the movements of the elbow levers are equal, and since the two wheels are located on both sides of the middle plane of the ploughshare and at an equal distance from the latter, the mean of the opposite movements of the wheels with respect to the ploughshare is nil and the penetration of the latter into the soil remains unchanged.

In this embodiment shown in FIGS. 9 and 10 the linkage between the upper ends of the two elbow levers 19, 21, 42 and 20, 22, 43 is ensured, as has been seen, by the threaded rod 50 which, besides its function of transmitting movement from one lever to another, also ensures a function of adjustment of the penetration of the ploughshare into the ground as has also been described previously but, of course, these two functions can if necessary be made independent, the function of transmitting traction forces being ensured by a link rod system articulated to the ends of the elbow levers and the adjustment of the penetration of the ploughshare being effected by any other suitable means, for example, by means of a screw-nut system such as that already described with reference to FIGS. 7 and 8, this system acting on a cross-piece connecting the lateral arms 22 and 23 which are then not fixed rigidly to the traction parallelogram 27 but pivotably hinged to the pillars 25 and 26 of the latter.

Of course, the scope of the invention is not limited only to only the particular embodiments described above but it extends also to modifications which would differ only in detail.

Thus, the two mechanical coordinating systems for the vertical movements of the wheels described above may be replaced notably by hydraulic jacks as has been seen with reference to FIGS. 5 and 6, the constructions then being realisable either by means of swinging support arms such as the support arms 19 and 20 and fixed arms 23, 24 with jacks slaved to each other so as to make variable simultaneously the aperture angles between each swinging support arm and its associated fixed arm, or by means of telescopic support arms or again mounted to slide in guide sleeves fast to the chassis of the machine with the jacks acting simultaneously to vary the length of the telescopic arms or that of the arms emerging from the guide sleeves.

I claim:

1. In a seed planter having a planter unit frame means adapted to be attached to a tool bar, furrow-opening means mounted fixed and immovable relative to said frame means during movement of said frame means in the performance of a seed planting operation, a pair of gauge wheels one each on opposite sides of said furrow opening means rotatably mounted on the lower ends of support arms which are pivotably mounted on said frame means, seed dispensing means mounted on said frame means, the improvement which comprises equalizer arm means operatively interconnecting said gauge wheel support arms for causing approximately equal and opposite rotation of said support arms to reduce the vertical displacement of said planter unit frame means and said furrow opening means relative to the displacement of said gauge wheels as the gauge wheels individually encounter irregularities and obstacles in their path of travel.

2. The improvement called for in claim 1 wherein said equalizer arm means is pivotally mounted intermediate its opposite ends on one end of support linkage attached to said frame means.

3. The improvement called for in claim 2 wherein said support linkage is adjustable so as to adjust the elevation of said gauge wheels relative to said furrow opening means and thereby regulate the furrow depth.

4. In a seed planter as called for in claim 2, said gauge wheel support arms being pivotally mounted on said frame means, and the opposite ends of said equalizer arm means being pivotally connected to the upper ends of said support arms.

5. In a seed planter as called for in claim 4, said support linkage having a second end which is opposite said one end and said second end being connected to said frame means.

6. In a seed planter as called for in claim 5, the upper ends of said support arms having ball formations the opposite ends of said equalizer arm means having socket formations fitting within said ball formations and the central portion of said equalizer means having means for permitting universal pivoting on said support linkage.

7. In a seed planter having a planter unit frame means adapted to be attached to a tool bar, furrow-opening means mounted fixed and immovable relative to said frame means during movement of said frame means in the performance of a seed planting operation, a pair of gauge wheels one each on opposite sides of said furrow opening means rotatably mounted on the lower ends of support arms which are pivotally mounted on said frame means, seed dispensing means mounted on said frame means, the improvement which comprises, equalizer arm means for operatively interconnecting said gauge wheel support arms for causing approximately equal and opposite rotation of said support arms to reduce the vertical displacement of said planter unit frame means and said furrow opening means relative to the displacement of said gauge wheels as the gauge wheels individually encounter irregularities and obstacles in their path of travel, said equalizer arm means extending between said support arms and generally transversely to the fore-and-aft longitudinal axis of said planter and being pivotally mounted intermediate opposite ends thereof for tilting in a generally transverse plane.

8. In a seed planter having a planter unit frame means adapted to be attached to a tool bar, furrow-opening means mounted fixed and immovable relative to said frame means for forming a furrow of desired predetermined depth as said frame means moves along the ground at a predetermined distance above ground surface, a pair of support arms, said furrow-opening means being positioned between said support arms, means for independently and freely pivoting said support arms to said frame means, a gauge wheel rotatably mounted on a lower end of each of said support arms and adapted to contact the ground surface in straddling relation to said furrow-opening means, equalizer arm means operatively interconnecting said support arms for constraining them to move in relatively opposite and equal angular directions relative to said frame means about their respective independent axes of pivoting and thereby support said frame means and maintain said furrow-opening means relative to the displacement at said predetermined depth when said gauge wheels are on level ground to reduce the vertical displacement of said planter unit frame means and said furrow-opening means relative to the displacement of said gauge wheels thus proportionally distributing any variations in the ground surface between both gauge wheels to thereby proportionally reduce any deviation in ground surface variations upon said furrow-opening means and the predetermined depth created thereby.

9. In a seed planter having a planter unit frame means adapted to be attached to a tool bar, furrow-opening means mounted on said frame means comprising at least one rotatable disc, said one rotatable disc having an axis of rotation which is fixed relative to said frame means during a seed planting operation, a pair of gauge wheels one each on opposite sides of said one rotatable disc rotatably mounted on the lower ends of support arms which are pivotally mounted on said frame means, seed dispensing means mounted on said frame means and including a seed chute extending downwardly adjacent said at least one rotatable disc, the improvement which comprises equalizer arm means operatively interconnecting said gauge wheel support arms for causing approximately equal and opposite rotation of said support arms to reduce the vertical displacement of said planter unit frame means and said one rotatable disc relative to the displacement of said gauge wheels as the gauge wheels individually encounter irregularities and obstacles in their path of travel, said equalizer arm means extending between said support arms and generally transverse to the fore-and-aft longitudinal axis of said planter and being pivotally mounted intermediate opposite ends thereof for tilting in a generally transverse plane.

10. In a seed planter having a planter unit frame means adapted to be attached to a tool bar, furrow opening means mounted on said frame means comprising at least one rotatable disc, said one rotatable disc having an axis of rotation which is fixed relative to said frame means during a seed planting operation, a pair of gauge wheel one each on opposite sides of said one rotatable disc rotatably mounted on the lower ends of support arms which are pivotally mounted on said frame means, seed dispensing means mounted on said frame means and including a seed chute extending downwardly adjacent said at least one rotatable disc, the improvement which comprises equalizer arm means operatively interconnecting said gauge wheel support arms for causing approximately equal and opposite rotation of said support arms to reduce the vertical displacement of said planter unit frame means and said one rotatable disc relative to the displacement of said gauge wheels as the gauge wheels individually encounter irregularities or obstacles in the path of travel, said equalizer arm means extending between said support arms and generally transversely to the fore and aft longitudinal axis of said planter and being pivotally mounted intermediate opposite ends thereof.

11. The improvement called for in claim 10 wherein said equalizer arm means is pivotally mounted intermediate its opposite ends on one end of support linkage attached to said frame means.

12. The improvement called for in claim 11 wherein said support linkage is adjustable so as to adjust the elevation of said gauge wheels relative to said furrow opening means and thereby regulate the furrow depth.

13. In a seed planter as called for in claim 11, said gauge wheel support arms being pivotally mounted on said frame means, and the opposite ends of said equalizer arm means being pivotally connected to the upper ends of said support arms.

14. In a seed planter as called for in claim 13, said support linkage having a second end which is opposite said one end and said second end being connected to said frame means.

15. In a seed planter as called for in claim 14, the upper ends of said support arms having ball formations the opposite ends of said equalizer arm means having socket formations fitting within said ball formations and the central portion of said equalizer arm means having means for permitting universal pivoting on said support linkage.

16. The improvement called for in claim 10 wherein said frame means is adapted to be attached for towing to a mobile power source, each gauge wheel being located generally adjacent an outer surface of said disc with the axes of rotation of said gauge wheels being rearward of the disc axis of rotation, and said equalizer arm means being mounted on said frame means.

17. The improvement called for in claim 10 wherein said equalizer arm is pivotally mounted on said frame means.

18. The improvement called for in claim 10 further comprising means for adjusting said equalizer arm means and thus said support arms to vary furrow depth.

* * * * *